United States Patent [19]

Lippold

[11] Patent Number: 5,053,131

[45] Date of Patent: Oct. 1, 1991

[54] FILTER CARTRIDGE

[76] Inventor: Hans-Joachim Lippold, Wredeweg 8, D-1000 Berlin 22, Fed. Rep. of Germany

[21] Appl. No.: 474,382

[22] Filed: Feb. 5, 1990

[30] Foreign Application Priority Data

Feb. 8, 1989 [DE] Fed. Rep. of Germany ....... 3903697
May 19, 1989 [DE] Fed. Rep. of Germany ....... 3916838

[51] Int. Cl.$^5$ .............................................. B01D 21/06
[52] U.S. Cl. .................................. 210/493.5; 55/521; 264/DIG. 48; 264/DIG. 62
[58] Field of Search ............... 210/493.1, 493.3, 493.5; 264/41, 45.1, DIG. 48, DIG. 62; 55/497–500

[56] References Cited

U.S. PATENT DOCUMENTS 3,531,920 10/1970 Hart .
4,268,290  5/1981 Barrington .

FOREIGN PATENT DOCUMENTS 2138412  3/1973 Fed. Rep. of Germany .
2835181  1/1980 Fed. Rep. of Germany .
2427123 12/1979 France .
2470630  6/1981 France .

OTHER PUBLICATIONS

European Search Report for Application No. EP 90 25 0040 dated Apr. 23rd, 1990.

Primary Examiner—Frank Sever
Attorney, Agent, or Firm—Spencer & Frank

[57] ABSTRACT

Filter cartridge, in particular with a block-like construction, comprising a plurality of fold walls created by folding in a zig-zag fashion for a medium to be filtered to pass through from one edge area of the zig-zag folding in the direction of the edge area of the folding on the opposite side made of a material which can be permeated by the medium to be filtered provided with offsets formed by roll forming, with those offsets which lie in contact with each other acting as spacers and stiffeners between adjacent fold walls, wherein the offsets of adjacent fold walls which face one another are stuck together.

35 Claims, 9 Drawing Sheets

FILTER CARTRIDGE

CROSS REFERENCE TO RELATED APPLICATION

This application claims the priority of Federal Republic of Germany Application No. P 39 03 697.9 filed Feb. 8th, 1989, which is incorporated herein by reference.

BACKGROUND OF THE INVENTION

This invention relates to filter cartridges and a method for their production.

Such filter cartridges are employed to filter various media. The filter cartridge comprises a permeable material, in particular a micro-filter matting which is folded in a zig-zag fashion and has a block-like form. During the filtration process the medium to be filtered passes through the filter cartridge from one edge area of the zig-zag folding in the direction of the edge area of the folding on the opposite side. The fold walls which are created by the folding of the filter material are provided with offsets which extend out on both sides of the plane of the fold walls. The offsets in the fold walls are arranged in such a way that an offset in the form of a raised portion on one fold wall is in contact with an offset in the form of a raised portion on the adjacent fold wall. Due to the folding in a zig zag fashion the offsets of the fold walls are in contact with each other and are supported in the region of the contact area.

In this way the adjacent fold walls are held apart at a set distance and a uniform flow of the medium through the filter walls is guaranteed.

A drawback of this arrangement is that pressure variations occur when the medium to be filtered passes through the filter material as the spacing between the filter walls cannot be exactly defined geometrically. This is due the forces resulting from the resistance to flow which deform the not sufficiently stable filter cartridge. In order to compensate for the greater resistance to flow the throughput of the medium to be filtered has to be made greater. In this way the operational life-span of the filter cartridge is lowered. In addition, the motor means required to throughput the medium to be filtered become increasingly noisier with increasing throughput.

The offsets in a fold wall can also only be of a limited height as the roll forming of the offsets in the filter material causes the wall thickness of the offsets to decrease. A large number of offsets also have to be positioned due to their low stability which in turn reduces the filter surface area available for the medium to be filtered to pass through. The resistance to flow thereby increases. This leads to a greater noise level in the filter plant and a shorter operational life-span thereof.

SUMMARY OF THE INVENTION

It is an object of the invention to provide a filter cartridge of the above-mentioned type, in which the stability and the rigidity of the filter cartridge is increased and in which the resistance to flow is greatly minimised.

The above and other objects are accomplished according to the invention by utilizing the realization that the filter cartridge be of an exactly defined geometrical shape and that this shape is not deformed by forces during filtration. The stability and the rigidity of the filter cartridge are to be increased in order to accomplish this and in particular the stability of the offsets formed in the fold walls is to be increased. The offsets lying in contact with each other are to be prevented from moving and the number of offsets required is to be reduced. In this way the whole surface area of the filter material is evenly used to filter the laminar flowing medium and no pressure variations occur along the path travelled by the medium which would otherwise increase the resistance to flow in an undesirable fashion.

It is in addition, in this case particularly advantageous that the offsets of two adjacent fold walls which lie in contact with each other are glued together. The stability and the rigidity of the filter cartridge is increased in this way and the number of offsets required can be reduced which in turn is advantageous as a favorable relationship between the effective filter surface area and the total surface area of the fold walls can be achieved.

In this way disposable filter cartridges with a long operational life-span can be produced cheaply. The fold walls which are of a filter material do not require fixed spacers or stiffeners of non-filter material.

Other advantageous features of the invention are in particular that the offsets of two adjacent fold walls have contact regions. These contact regions can be linear as in one feature of the invention in which case the adhesive is applied in the area of these lines. In further preferred embodiments of the invention the contact regions or adjacent regions can be round or angled in shape. A plurality of flow conditions can be created in the filter cartridge and also the stability of the structure can be increased.

It is particularly advantageous, that the offsets and the side faces of the offsets are covered with a layer of adhesive coating. Because of this the rigidity of the offsets can be increased. It is, in particular, advantageous to increase the thickness of the coating in the direction away from the plane of the fold wall as the resulting tapered walls of the offsets are more rigid and more stable. It is advantageous that the resulting weakening of the material is not only compensated for but that a filter unit of great stability can be constructed which does not require additional stiffening means.

In a further preferred embodiment the fold edges are formed in a trapeze-like shape at the bottom of the folds. The pressure distribution is more even and, in particular, the fold wall can be of a greater height than in the other embodiments without undesirably high pressure differences occurring when the medium to be filtered passes through the filter material. These small pressure differences are, in particular, caused by the minimally greater concentration of material at the fold edge and could possibly also be caused by the medium to be filtered having a greater available filter surface area in this region. The advantageous laminar flow which is advantageous for the filter process is still on hand. The greater height of the fold walls does not only increase the filter area but betters all the filter characteristics and in particular the filter efficiency. The wider construction of the fold edge leads to a much better relationship of the pressure difference to the fold height. This leads to a greater rigidity and a longer operational life-span of each filter cartridge.

In another advantageous embodiment of the invention the adhesive material is placed on the offsets, in particular on the raised portions, in a net-like or spun fashion. In this way a total closure of the surface area of the filter material is prevented. Even though the filter material is rigid enough its filter characteristics are only slightly impaired. In addition the amount of adhesive material required is reduced so that the material costs are lowered.

An advantageous preferred method to apply the layer of adhesive to the filter material is to roll it on whereby the two rolls are situated on either side of the film-like filter matting. As the filter matting passes between the roll opening one can either apply the layer of adhesive to the highest parts of the offsets only or to all of the offsets including the offset side faces. The surface of the roll in the latter method has recesses in it into which the formed offsets fit.

The method of manufacturing a filter cartridge uses, in particular, a film-like filter material which is pulled through a first roll opening which is made by two forming rolls whereby offsets, areas of transition and fold edges corresponding to the raised surface of the rolls are formed on the filter material. Then the filter material is pulled through a second roll opening which is made by two other rolls which have a smooth surface covered with a layer of adhesive. The highest parts of the offsets on the side of the material facing the rolls are coated with the adhesive layer. By using this method only the contact areas of the offsets are coated with a layer of adhesive.

Another variation in the method of manufacturing a filter cartridge uses, in particular, a film-like filter material which is pulled through a first roll opening which is made by two forming rolls whereby offsets, areas of transition and fold edges corresponding to the raised surface of the rolls are formed on the filter material. Then the filter material is pulled through a second roll opening which is made by two other rolls which have recesses in their surfaces into which the formed offsets can fit and whose surfaces are covered with a layer of adhesive. The offsets on the side of the material facing the rolls are coated with the adhesive layer. In particular, by using this method all of the offsets are coated with a layer of adhesive which means that they are of a higher rigidity after the adhesive has hardened.

In addition the surface of the second rolls either have tangential grooves which coincide with the cross-section of the offsets or tangential recesses shaped to coincide with the shape of the offsets. An advantageous feature is that the second rolls either have an eccentric bearing or have a camshaft drive which enable the rolls to follow the wedge-like form of the surface of the offsets as the filter material is pulled through. In this way adhesive can be applied easily to the wedge-like areas.

Another advantageous variation is when the shape of the areas which fit the offsets differ in the first and the second rolls in that the second roll has an increasingly greater cross-section in the direction of the highest part of each offset than the first roll so that the amount of adhesive applied increases in the direction of the highest part of the offset to achieve a high rigidity in this area.

According to another method of manufacture the filter material is pulled through a first roll opening which is made by two forming rolls whereby offsets, areas of transition and fold edges corresponding to the raised surface of the rolls are formed on the film-like filter material. Then the adhesive material is applied to regions of the filter material whereby the adhesive material is constantly emitted from nozzles positioned above the filter material. Gas, in particular warm gas, is directed around the nozzle so that a gas whirl is formed which moves the adhesive material and thereby falls onto the filter material which is constantly moving under the nozzle in a net-like or spun fashion. In this way adhesive can be easily applied to the filter material in a net-like or spun fashion.

In another preferred embodiment the filter cartridge comprises at least in part some thermoplastic fibres so that a wanted lasting deformation and areas of higher rigidity can be achieved by heat treatment which can be carried out by welding the filter material in the filter layer. Even though the welding increases the material density the filter characteristics are not or only slightly impaired. The filter characteristics are in any case much better than those of filter material with binders. Due to the possibility of binding together individual filter layers which means that the separation of individual layers can be prevented as well as the improved longitudinal and horizontal rigidity the filter materials according to the invention are foldable and usable for the normal filter uses.

The filter media consist of plastic fibre material and have a higher filter efficiency and lower pressure differences than the usual glass fibre materials. This results in a lower required throughput and a longer operational life-span of the filter cartridges. In addition a reduction of the required throughput leads to a reduction in noise of the motor means. It is furthermore advantageous that by pressing the offsets into the filter material the fold walls have a good stability despite their smaller wall thickness. The filter area can therefore be increased by using a smaller number of offsets. The resistance to flow is also lowered and a homogenous type of flow is guaranteed. This results in a lower suction rate, a less noisy filter and a longer operational life of the filter cartridge.

The thermoplastic and in part welded fibres cause the stability and the rigidity of the filter cartridge to be increased in certain areas, in particular at the offsets, in areas of transition and at the fold edges. The reduction in the number of offsets due to this is also advantageous as a favorable relationship can be achieved between the effective filter surface area and the total surface area of the fold walls. The filter cartridges can be produced as disposable filters at a low cost and have a long operational life-span. The filter walls are of a thermoplastic material and do not require fixed spacers or stiffeners of non-filter material.

The fibres are connected together in the welded state without any appreciable air voids. The permeable filter material is multi-layered whereby individual layers are welded together in part so as to prevent the individual layers from separating. It is furthermore advantageous if the permeable filter material consists of fibres, or at least fibre parts, such as polypropylene, cellulose, polycarbonate, polyamide, TEFLON ® (E. I. DuPont; polytetrafluoroethylene) and/or polyester. This composition ensures that there is a sufficient amount of thermoplastic material in the filter material and that the filter characteristics are suited to the requirements. It is advantageous to construct the seam-like welded areas in the form of joint lines.

BRIEF DESCRIPTION OF THE DRAWINGS

FIG. 1b is a plan elevation of the filter material according to FIG. 1a.

DESCRIPTION OF THE PREFERRED EMBODIMENTS

Figure 1A:
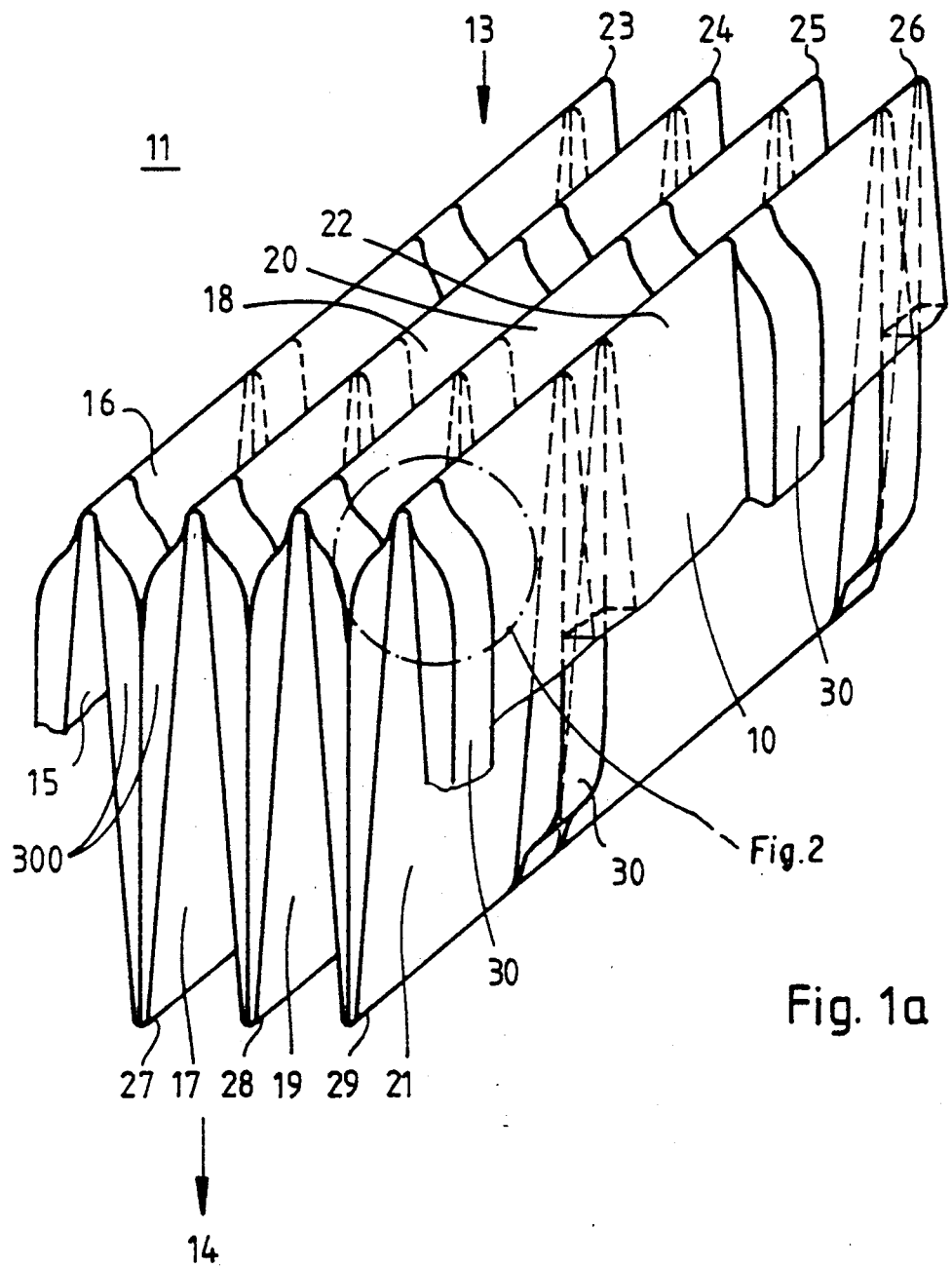
FIG. 1a is a perspective view of a part of a preferred embodiment of the filter material.
Figure 1B:
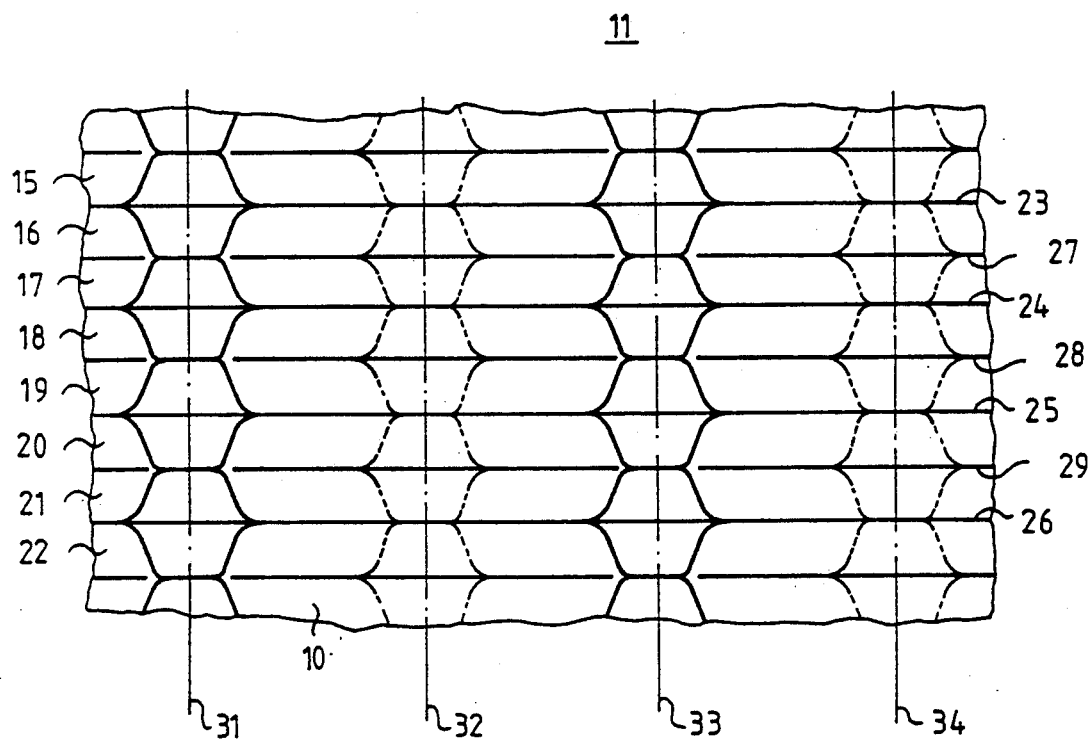
Figure 4:
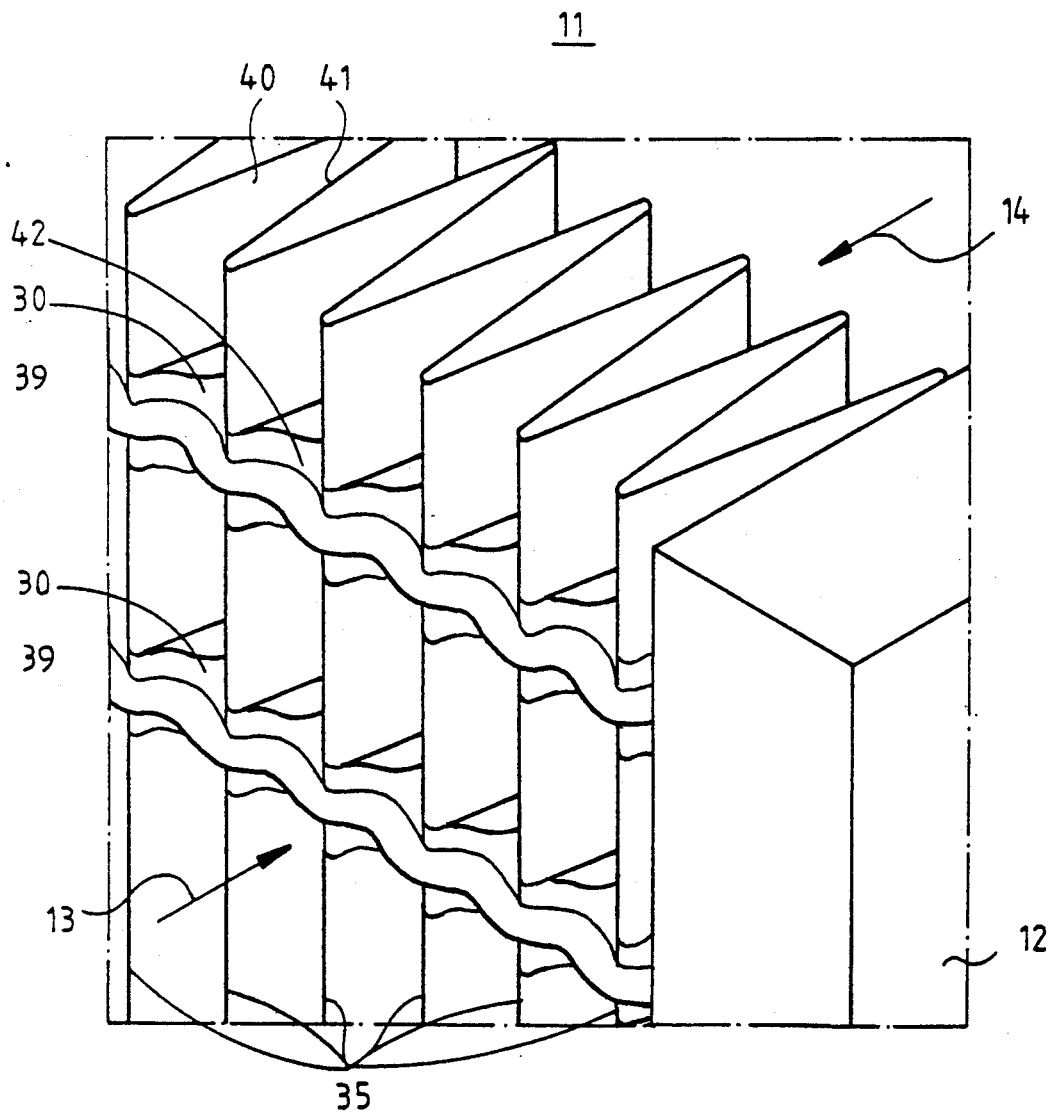
FIG. 4 is a perspective plan view of a preferred embodiment of the filter material folded to a filter cartridge showing the holding means for the folds.

Turning to the FIGS. 1a, 1b and 4, a part of the preferred embodiment of the filter material 10 consisting of a filter matting is shown, which by zig-zag folding can be formed into a block-like filter cartridge 11. This filter matting is in particular a filter matting for suspended particles. In principal any filter material can be used which can be formed in the desired fashion.

The block-like filter cartridge 11 fits in a known way into a frame 12, which further stabilizes the filter cartridge. The filter cartridge can, according to the required use, also be constructed in a frameless fashion in which case the outer measurements are constructed in accordance with the recess into which it is to be fitted. The medium to be filtered flows from the entrance side 13 through the filter cartridge in the direction of the exit side 14 on the opposite side from where it is either extracted via an extraction pipe or flows out freely.

The filter material 10 in FIG. 1a and 1b is folded in a zig-zag fashion in which a number of fold walls 15 to 22 form one fold each. The fold walls 15 and 16 are connected together by a fold 23 on the entrance side 13. The fold walls 17 and 18 are similarly connected together by a fold 24, the fold walls 19 and 20 by a fold 25 and the fold walls 21 and 22 by a fold 26. The fold walls 16 and 17 are connected together by a fold 27 on the exit side 14. The fold walls 18 and 19 are similarly connected together by a fold 28 and the fold walls 20 and 21 by a fold 29. This folding enlargens the filter surface area and thereby enlargens the filter efficiency of the filter cartridge 11. This is caused by the optimization of the acceleration distribution and the reduction of the pressure difference. The operational life-span is longer than that of the usual equivalent filters.

The fold walls 15 to 22 have offsets 30 made of the same material, which are created by roll forming the filter material (filter matting for suspended particles). The offsets 30 are of constant width in the direction of flow of the medium to be filtered. The width is smaller than the greatest height of the offsets as measured from the plane of the panel fold wall. The side faces 300 of the offsets 30 run vertical to the folds 23 to 29 which connect together the fold walls 15 to 22. The height of the offsets 30 as measured from the plane of the fold walls 15 to 22 constantly increases in the direction away from the folds 27 to 29 towards the folds 23 to 26.

The contact region of the offsets 30 is rectangular in shape. In this way the stability of the filter cartridge is enhanced. The surface area of the filter element has been increased by roll forming the fold walls 15 to 22 and the additional material required was obtained from the fold wall to be roll formed during the roll forming operation. The walls of the offsets 30 are therefore thinner. The application of adhesive makes just these areas more rigid so that the weakening of the material due to the deformation process is eliminated or in some cases, depending on the amount of adhesive applied more than compensated for.

The offsets 30 of adjacent fold walls 15 to 22 lie in contact with each other and act as spacers and increase the rigidity. For example the height of two offsets 30, which lie in contact with each other, of the fold walls 16 and 17 which are connected together by the fold 27 constantly increase in the direction of the folds 23 and 24 on the opposite side as measured from the plane of the fold walls 16 and 17 respectively. In this way the spacing between the two fold walls 16 and 17 decreases in the direction of flow of the medium to be filtered until the medium to be filtered passes through the respective fold wall 16 or 17 from when on the spacing increases. In this way it is guaranteed that with a laminar flow the whole surface of the filter material is evenly used for filtering and that no pressure variations occur along the path travelled by the medium to be filtered. These could otherwise increase the resistance to flow in an undesirable fashion.

The offsets 30 are situated along the lines 31 to 34 which are equally spaced apart from each other. The offsets are situated alternately on either side 13 and 14 in such a way that the offsets 30 are on entrance side 13 on lines 31 and 33 and the offsets 30 are on the exit side 14 on lines 32 and 34. The stability is greater due to the alternating position of the offsets 30 as the fold walls are not only positioned apart with a set spacing on the entrance side 13 but also the exit side 14.

Figure 2:
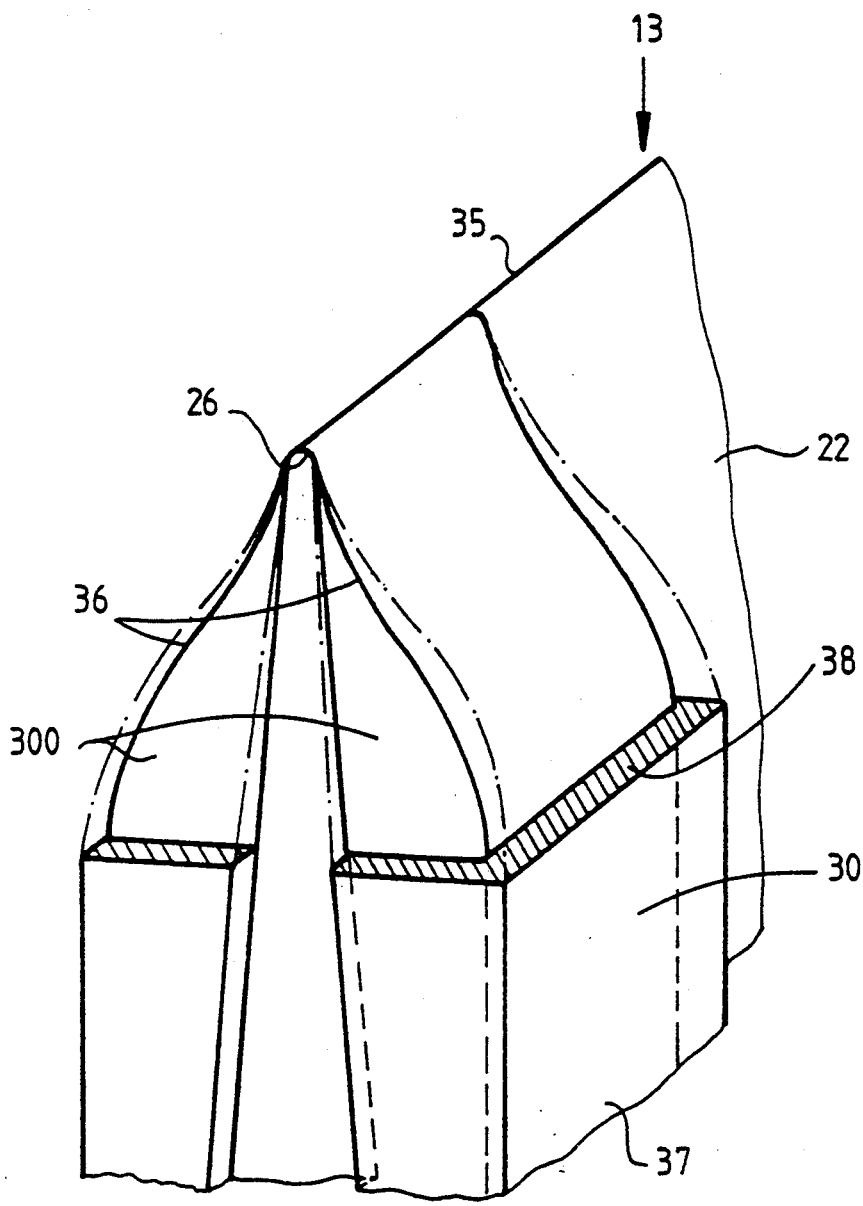
FIG. 2 is an enlargened view of detail A of FIG. 1a of the filter material.

The enlargened view of detail A of FIG. 1a in FIG. 2 shows the area of transition 36 between the fold edge 35 created by the fold 26 and the offset 30 protruding out of the fold wall 22.

The area of transition 36 extends from that end of the offset 30 which is the greatest distance away from the plane of the fold wall in the direction of the fold edge 35 in the plane of the fold wall 22. The area of transition 36 comprises an area of greater incline lying between two areas of lesser incline. In particular the areas of lesser incline continually and gradually run into the adjacent level areas. A rectangular area 37 is part of the contact area of two neighbouring adjacent offsets 30 of the fold walls. The areas of transition 36 are formed to have good flow characteristics so that the resistance to flow, which can among other things build up at the offsets, be lessened.

The offset 30 and the area of transition 36 are coated with a layer of self-hardening and rigidifying adhesive 38 of which only a fragment which ends at the end of the offset 30 in the direction of the fold edge 35 is illustrated so as to enable better viewing of the shape and the position of the individual constructive elements. The filter can be soaked with a self-stiffening, self-hardening adhesive material as an alternative to the layer of adhesive coating 38.

The layer of adhesive coating 38 continues and also covers the side faces 300 of the offsets 30 and the area of transition 36. The thickness of the adhesive coating 38 of the offset walls increases with increasing distance of the offset 30 from the fold wall 22. The thinner walls of the offsets 30 due to the pressing process and their accompanying lesser stability are compensated for by the application of the hardening adhesive coating 38 which increases the rigidity of the offsets 30. The offsets, due to the adhesive coating 38 are of the required rigidity and stability to be able to stand up to the forces which act upon them during the filter process.

The adjacent offsets 30 which lie in contact with each other can be glued together by way of the layer of adhesive coating 38 on each offset. The filter cartridge 11 is thus stabilized and is able to retain its block-like form even without a frame. This means that the insertion of the filter cartridges 11 into the known filter casing 12 is greatly simplified.

Figure 3:
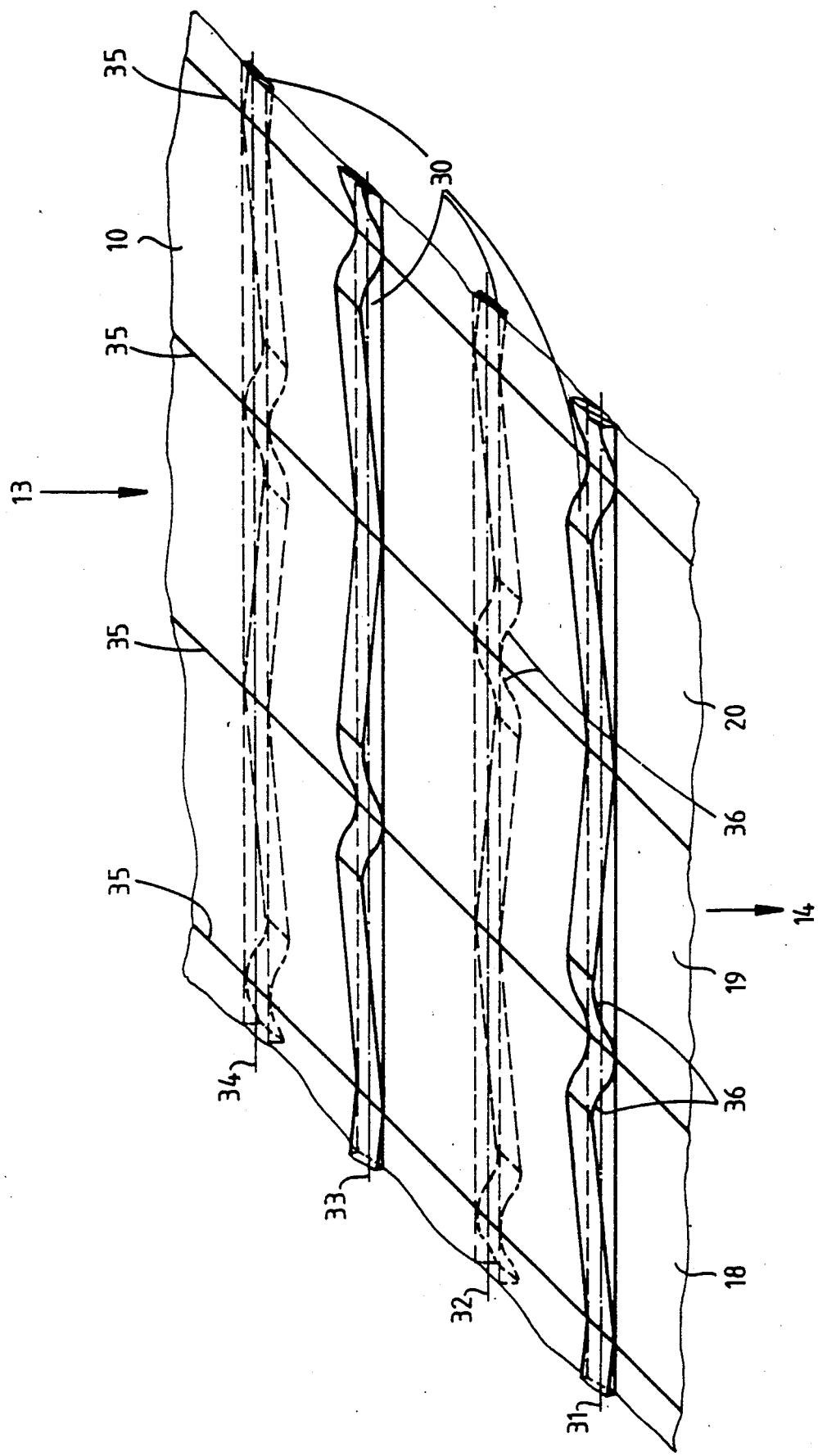
FIG. 3 is a perspective view of a part of the filter material in an unfolded state.

In FIG. 3 a part of the filter material 10 is illustrated in an unfolded state.

The offsets 30 can alternately be seen on the entrance side 13 and on the exit side 14 of the filter material. The offsets 30 are formed by passing the filter material 10 between two forming rolls which are described in detail in FIG. 6. Offsets 30 are formed on the lines 31 to 34 with their respective areas of transition 36 and fold edges 35. A self-hardening layer of adhesive coating 38 is then applied to the offsets 30 and their side faces 300.

In a further preferred embodiment the amount of adhesive applied to the offsets increases in the direction of the highest part of the offset so as to achieve a high rigidity in this area.

A partial plan view of a filter cartridge 11 is illustrated in FIG. 4 in which two stabilizing threads 39 running parallel to one another are attached to the filter cartridge 11. The threads 39 are positioned perpendicularly to the fold edges 35 and connect the fold edges 35 together along the shortest path in the plan view. The threads are positioned on the surface of the filter cartridge 11. Starting from the fold edge 35 on the fold wall 40 the threads 39 run to the offset 30 of this fold wall 40 and along this offset until the point where this offset lies in contact with the offset 30 of the fold wall 41 opposite. The threads 39 then continue to run along the surface of the offset 30 of the fold wall 4 and along the fold wall 41 until they reach the next fold edge. The threads 39 surround the fold edges 35 and the fold walls (not illustrated) which are at the outer ends of the filter cartridge 11. The filter cartridge 11 is thus easy to handle and is highly stable which means that it can also be used for larger filters.

The threads consist of a homogenous foamy, sticky and/or a self-hardening plastic or a strip material such as cardboard or such like. In this way the threads 39 are stuck to the areas of the filter cartridge 11 they are in contact with. The threads 39 are prevented from slipping and the stability of the filter cartridge 11 is improved. The threads 39 which stabilize the filter cartridge 11 can, in a preferred embodiment, be positioned in the region of the fold walls (not illustrated) which are at the outer ends of the filter cartridge 11. The changing of the filter cartridge 11 is in this case quite unproblematic.

Figure 5:
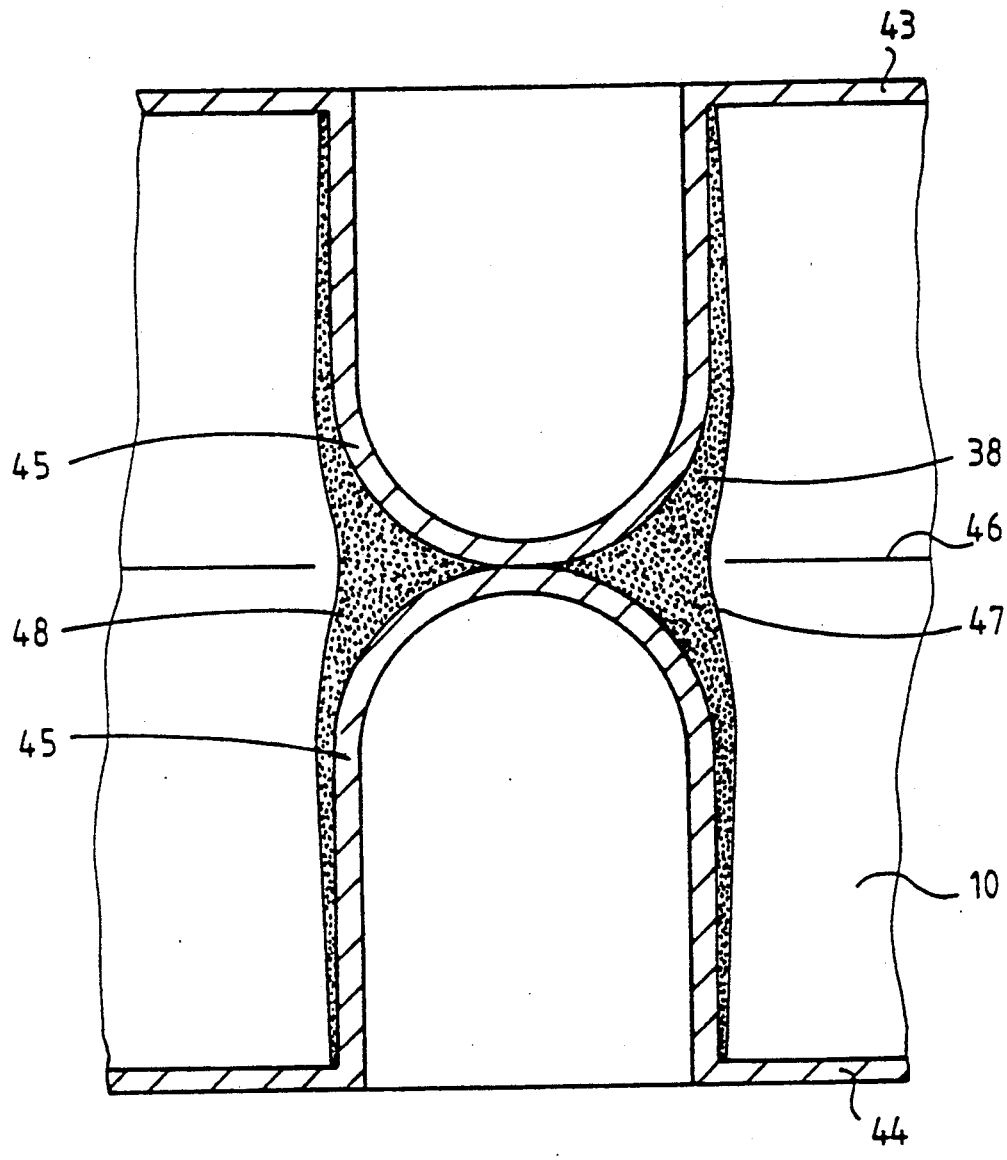
FIG. 5 is an enlargened section through two offsets of the fold walls which are in contact with each other and stuck together.

An enlargened section of two offsets is illustrated in FIG. 5. The two offsets 45 are formed in the fold walls 43 and 44. The height of the offsets 45 as measured from the plane of the fold walls 43 and 44 increases starting from the fold 46 in the direction of the opposite fold (not illustrated). The width of the offsets 45 is constant. In this case this width is smaller than the greatest height of the offset as measured from the plane of the fold walls 43 and 44. The offsets 45 thus have essentially the same characteristics as the already described offsets 30. The difference nevertheless lies in the round shape of the offsets 45. By choice these offsets can also be inclined.

The thickness of the layer of adhesive coating 38 of the offset walls also increases with increasing distance of the offset 45 from the respective fold wall 43 and 44. The offsets 45 have linear contact and the layer of adhesive coating 38 is positioned on both sides of the linear contact so that the layer of adhesive coating forms side walls 47 and 48 with good flow characteristics. The layer of adhesive coating stabilizes the filter cartridge 11 which means that the spacing of the lines 31 to 34 on which the offsets 30 or 45 are positioned can be made larger. Due to the good flow characteristics of the side walls 47 and 48 the flow of the medium to be filtered is laminar. The resistance to flow is lowered as the number of offsets is reduced which in turn reduces the energy required for suction or throughput.

Figure 6:
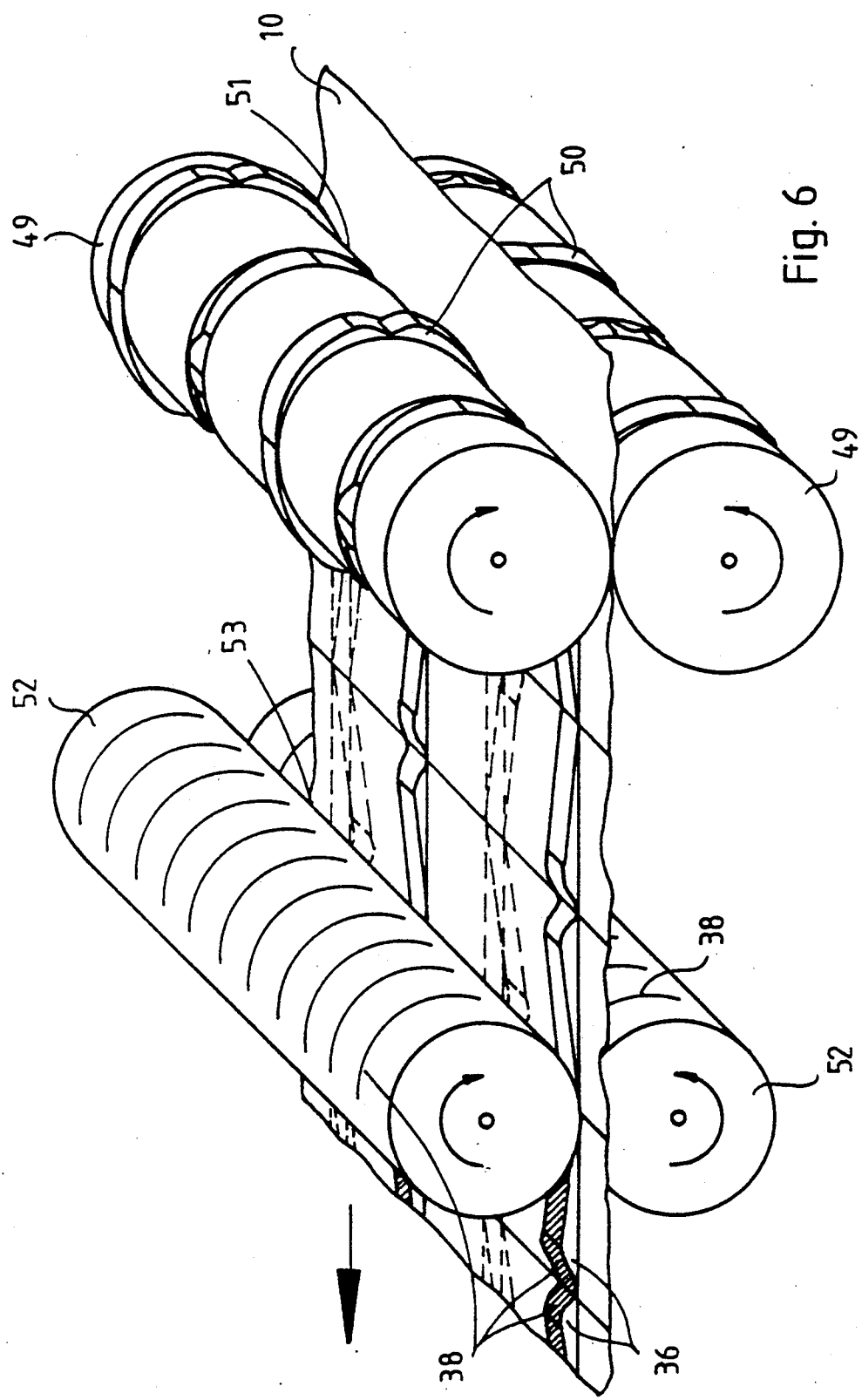
FIG. 6 is a perspective view of a part of the filter material being manufactured by a preferred process.

A perspective view of a part of the filter material being manufactured is illustrated in FIG. 6. This method of manufacturing a filter cartridge uses, in particular, a film-like filter material 10 which is pulled through a first roll opening 51 which is made by two forming rolls 49 whereby offsets 30, areas of transition 36 and fold edges corresponding to the raised surface 50 of the rolls 49 are formed on the filter material 10. The filter material 10 is then pulled through a second roll opening 53 which is made by two other rolls 52 which have a smooth surface covered with a layer of adhesive 38. The highest parts of the offsets 30 on the side of the material facing the rolls 52 are coated with the adhesive layer 38. By using this method only the contact areas of the offsets 30 are coated with a layer of adhesive 38.

Figure 7:
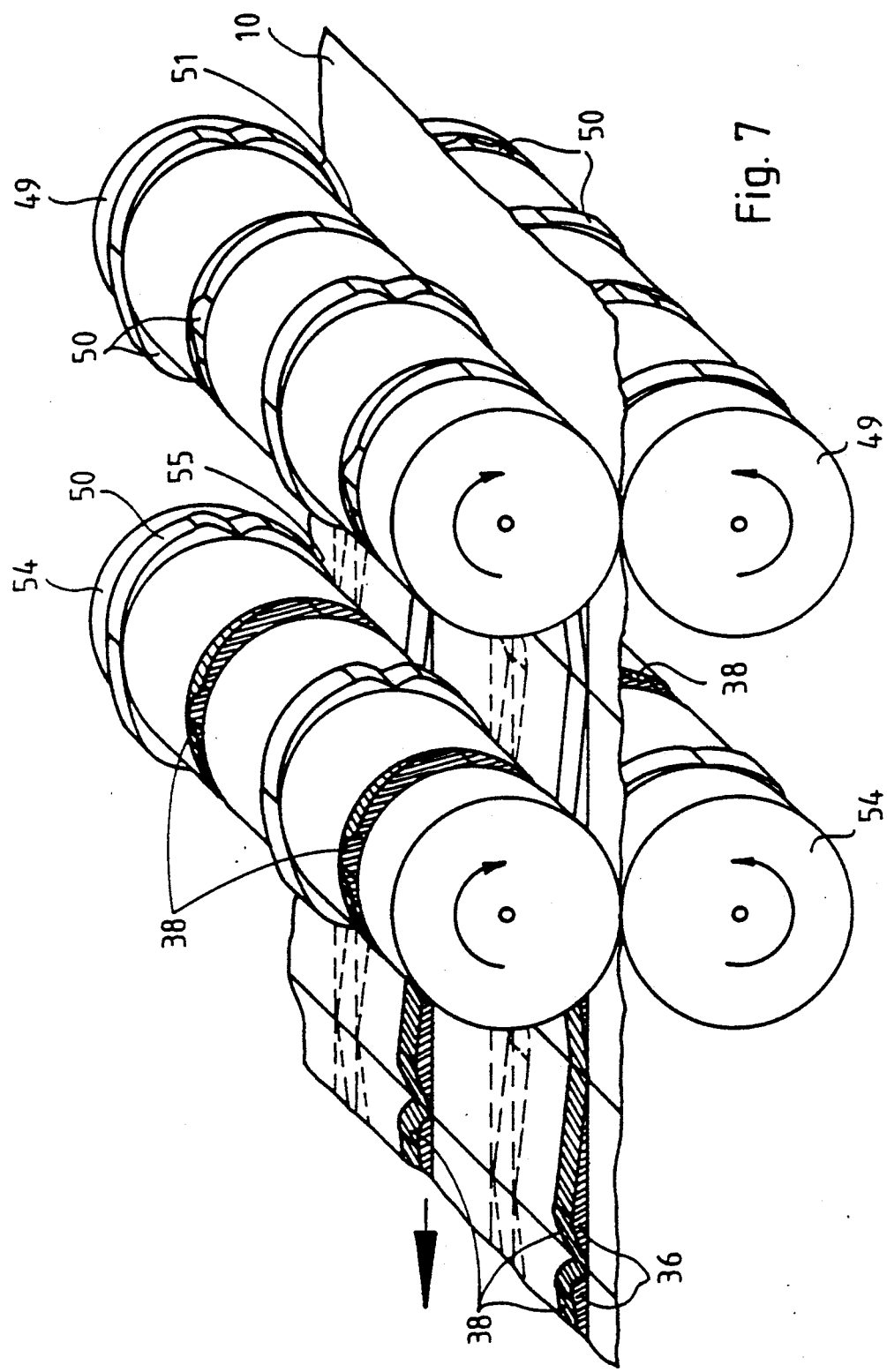
FIG. 7 is a perspective view of a part of the filter material being manufactured by a further preferred process.

Another variation in the method of manufacturing a filter cartridge is illustrated in FIG. 7 and uses, in particular, a film-like filter material 10 which is pulled through a first roll opening 51 which is made by two forming rolls 49 whereby offsets 30, areas of transition 36 and fold edges corresponding to the raised surface 50 of the rolls 49 are formed on the filter material 10. The filter material 10 is then pulled through a second roll opening 55 which is made by two other rolls 54 which have recesses 50 in their surfaces into which the formed offsets 30 can fit and whose surfaces are covered with a layer of adhesive 38. The offsets 30 on the side of the material 10 facing the rolls 54 are coated with the adhesive layer 38. In particular, by using this method all of the offsets 30 are coated with a layer of adhesive 38 which means that they are of a higher rigidity after the adhesive 38 has hardened.

In addition the surface of the second rolls 54 either have tangential grooves which coincide with the cross-section of the offsets 30 or tangential recesses shaped to coincide with the shape of the offsets 30. An advantageous feature is that the second rolls 54 either have an eccentric bearing or have a camshaft drive which enable the rolls 54 to follow the wedge-like form of the surface of the offsets 30 as the filter material 10 is pulled through. In this way adhesive 38 can be applied easily to the wedge-like areas.

Another advantageous variation is when the shape of the areas 50 which fit the offsets 30 differ in the first roll 49 and the second rolls 54 in that the second roll 54 has an increasingly greater cross-section in the direction of the highest part of each offset 36 than the first roll 49 so that the amount of adhesive 38 applied increases in the direction of the highest part of the offset 36 to achieve a high rigidity in this area.

Figure 8:
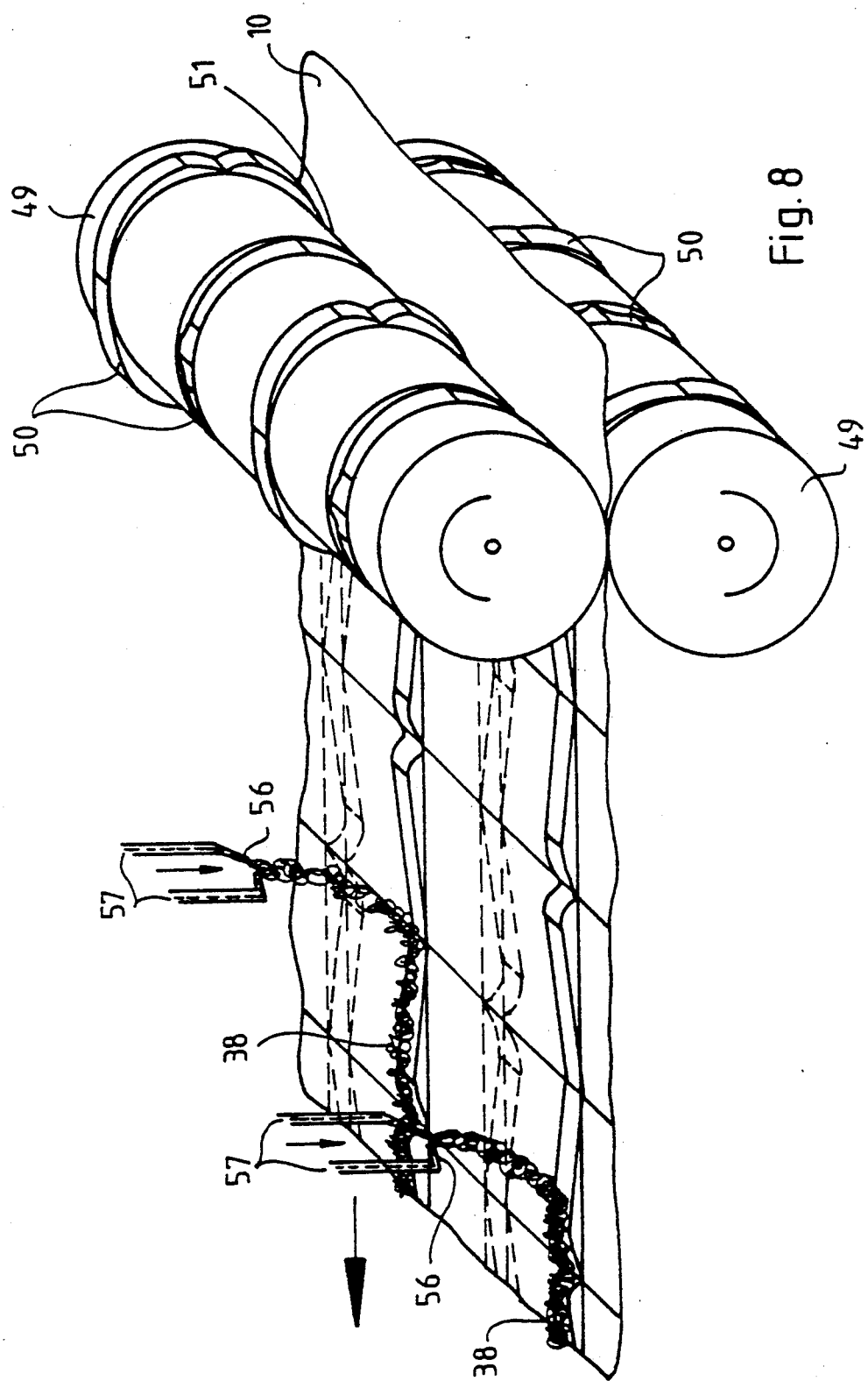
FIG. 8 is a perspective view of a part of the filter material being manufactured by yet another preferred process.

In FIG. 8 a further manufacturing method is illustrated. The filter material 10 is pulled through a first roll opening 51 which is made by two forming rolls 49 whereby offsets 30, areas of transition 36 and fold edges 35 corresponding to the raised surface of the rolls 50 are formed on the film-like filter material 10. Then the adhesive material 38 is applied to regions of the filter material 10 by adhesive material 38 being constantly emitted from nozzles 56 positioned above the filter material 10. Gas 57, in particular warm gas, is directed around the nozzle 56 so that a gas whirl is formed which moves the adhesive material 38 and thereby falls onto the filter material 10, which is constantly moving under the nozzle 56, in a net-like or spun fashion. In this way adhesive 38 can be easily applied to the filter material 10 in a net-like or spun fashion.

The filter material 10 comprises fibres which are of a thermoplastic material in another not illustrated embodiment of the invention. The amount of thermoplastic fibres present is sufficient to weld regions of the filter material 10 together by treating them locally with heat. The filter material 10 has thereby itself become more dense and more rigid and is connected to material of the same composition.

The fold edges 23 to 29 are made by pressure and/or heat treatment of the fibres which leads to them being welded together and in the shape of a joint lines. In this case the fibres are connected together without any appreciable air voids. The permeable filter material 10 is nevertheless multi-layered. The outer layers are of polypropylene which is a thermoplastic material. This means that the filter characteristics can be adapted to the requirements of the manufacturing and the filter process by thermal treatment. The outer layers and the inner layers of the filter medium can be welded together in part, compacted and made more rigid. The initially slightly less stable walls of the offsets 30 caused by their formation process can be made more rigid again by thermal treatment.

It will be understood that the above description of the present invention is susceptible to various modifications, changes and adaptations, and the same are intended to be comprehended within the meaning and range of equivalents of the appended claims.

I claim:

1. A filter cartridge, in particular with a block-like construction, comprising a plurality of zig-zag fold walls having fold edges between adjacent ones of said fold walls, said fold walls including a film-like filter material folded in a zig-zag fashion for a medium to be filtered to pass through from one edge area of the plurality of zig-zag fold walls in the direction of the edge area of the opposite side of the fold walls, said material of the fold walls being made of a material which can be permeated by the medium to be filtered and being provided with offsets, with those offsets which lie in contact with each other acting as spacers and stiffeners between adjacent fold walls, wherein said offsets of adjacent fold walls which face one another are stuck together for stabilizing and rigidifying said filter cartridge.

2. Filter cartridge as defined in claim 1, wherein said offsets of adjacent fold walls which face one another comprise contact areas which lie in contact with one another.

3. Filter cartridge as defined in claim 1, wherein said offsets of adjacent fold walls which face one another are in linear contact with each other and adhesive is applied in the region of said linear contact.

4. Filter cartridge as defined in claim 3, wherein said contact areas or regions adjacent to said contact areas are round or inclined in shape.

5. Filter cartridge as defined in claim 1, wherein said offsets are covered with a self-stiffening, self-hardening layer.

6. Filter cartridge as defined in claim 1, wherein said offsets are soaked with a self-stiffening, self-hardening substance.

7. Filter cartridge as defined in claim 5, wherein said layer covers said side faces of said offsets.

8. Filter cartridge as defined in claim 6, wherein said side faces of said offsets are soaked with said substance.

9. Filter cartridge as defined in claim 5, wherein the thickness of said layer increases with increasing distance of said offsets from said fold walls.

10. Filter cartridge as defined in claim 6, wherein the intensity of soaking with said substance increases with increasing distance of said offsets from said fold walls.

11. Filter cartridge as defined in claim 5, wherein said layer comprises an adhesive material.

12. Filter cartridge as defined in claim 6, wherein said substance comprises an adhesive material.

13. Filter cartridge as defined in claim 3, wherein said adhesive material is applied to said offsets in a net-like or spun fashion.

14. Filter cartridge as defined in claim 1, wherein at least one stabilizing thread is attached to said filter cartridge by being attached to and running essentially perpendicularly to said fold edges.

15. Filter cartridge as defined in claim 14, wherein said stabilizing thread is attached to said filter cartridge such that it runs in a straight line along the surface of the offsets in contact with each other between two fold walls facing each other.

16. Filter cartridge as defined in claim 14, wherein said thread which stabilizes said filter cartridge is continuous and runs around said fold edges of said filter cartridge and said filter walls which are on the outer ends of said filter cartridge.

17. Filter cartridge as defined in claim 14, wherein said thread which stabilizes said filter cartridge acts as a guide when inserting said filter cartridge into a filter housing.

18. Filter cartridge as defined in claim 14, wherein said thread which stabilizes said filter cartridge comprises a foamy, sticky and self-hardening plastic.

19. Filter cartridge as defined in claim 1, wherein said fold edges are formed in a trapezoid-like shape at the bottom of said folds.

20. Filter cartridge as defined in claim 1, wherein said permeable filter material comprises fibres of thermoplastic material which by welding increase the density of said filter material or become more rigid or join it together with other material.

21. Filter cartridge as defined in claim 20, wherein it comprises seam-like regions in which said fibres are joined together without any appreciable air voids.

22. Filter cartridge as defined in claim 20, wherein said permeable filter material comprises a plurality of layers, of which said layers can be regionally and individually welded together.

23. Filter cartridge as defined in claim 20, wherein said permeable filter material comprises fibres or at least comprises in part fibres of polypropylene, cellulose, polycarbonate, polyamide, polytetrafluoroethylene and/or polyester.

24. Filter cartridge as defined in claim 20, wherein the outer layers of said filter material also comprise a thermoplastic material and can, in particular, be welded together to form seam-like areas.

25. Filter cartridge as defined in claim 24, wherein said seam-like welded areas are in the form of joint lines.

26. Method for the production of a filter cartridge having a plurality of fold walls folded in a zig-zag fashion, a plurality of offsets acting as spacers and stiffeners between adjacent ones of said plurality of fold walls, and the offsets of adjacent fold walls being stuck together for stabilizing and rigidifying said filter cartridge, comprising the steps of:

supplying a film-like filter material;
pulling the film-like filter material through a first roll opening defined by two forming rolls having raised surfaces, the raised surfaces being configured for forming offsets, areas of transition, and fold edges on the film-like filter material;
applying adhesive to the offsets formed in said pulling step; and
folding the film-like filter material worked in the previous steps to provide the finished filter cartridge.

27. A method for the production of a filter cartridge as defined in claim 26, wherein said step of applying adhesive comprises further pulling the film-like material worked in said prior pulling step through a second roll opening defined by two further forming rolls each having a substantially smooth surface covered with adhesive for coating highest parts of the offsets formed in said prior pulling step to be coated with an adhesive layer.

28. A method for the production of a filter cartridge as defined in claim 26, wherein said step of applying adhesive comprises further pulling the filter-like material worked in said prior pulling step through a second opening defined by two further forming rolls each having recessed surfaces for receiving the offsets formed in said prior pulling step, the recessed surfaces having a layer of adhesive for coating the offsets on the side of the film-like filter material facing the two forming rolls.

29. A method for the production of a filter cartridge as defined in claim 28, wherein said step of applying adhesive comprises providing the two further forming rolls with tangential grooves for coinciding with the cross-section of the offsets.

30. A method for the production of a filter cartridge as defined in claim 28, wherein said step of applying adhesive comprises providing the two further forming rolls with tangential recesses for coinciding with the shape of the offsets.

31. A method for the production of a filter cartridge as defined in claim 28, wherein said pulling step comprises forming wedge-like offsets, and said step of applying adhesive comprises providing the two further forming rolls with eccentric bearings for enabling the two further forming rolls to follow the wedge-like form of the offsets.

32. A method for the production of a filter cartridge as defined in claim 28, wherein said pulling step comprises forming wedge-like offsets, and said step of applying adhesive comprises providing the two further forming rolls with a camshaft drive for enabling the two further forming rolls to follow the wedge-like form of the offsets.

33. A method for the production of a filter cartridge as defined in claim 28, wherein said pulling step comprises forming wedge-like offsets having high parts and low parts, and said adhesive applying step comprises providing the two further forming rolls with recessed surfaces having cross-sections which have an increasingly greater cross-section in the direction of the highest part of each offset than the cross-sections of the first rolls in said pulling step so that the amount of adhesive applied increases in the direction of the highest part of the offsets.

34. A method for the production of a filter cartridge as defined in claim 26, wherein said step of applying adhesive comprises positioning nozzles above the film-like material formed in said pulling step, emitting adhesive material from the nozzles, and directing gas around the nozzles to form a gas whirl to agitate the adhesive material and to cause the adhesive material to fall onto the film-like filter material in a net-like or spun fashion.

35. A method for the production of a filter cartridge as defined in claim 34, wherein said adhesive applying step comprises warming the gas prior to directing the gas around the nozzles.

* * * * *